(12) United States Patent
Desai et al.

(10) Patent No.: US 6,567,816 B1
(45) Date of Patent: May 20, 2003

(54) METHOD, SYSTEM, AND PROGRAM FOR EXTRACTING DATA FROM DATABASE RECORDS USING DYNAMIC CODE

(76) Inventors: Paramesh Sampatrai Desai, 6964 McCall Dr., San Jose, CA (US) 95120; John Marland Garth, 2424 Bridle Path Dr., Gilroy, CA (US) 95020

( * ) Notice: Subject to any disclaimer, the term of this patent is extended or adjusted under 35 U.S.C. 154(b) by 0 days.

(21) Appl. No.: 09/520,121

(22) Filed: Mar. 7, 2000

(51) Int. Cl.[7] .................................. G06F 17/30

(52) U.S. Cl. ..................... 707/102; 707/101; 707/103; 707/104

(58) Field of Search ................................ 707/101–104

(56) References Cited

U.S. PATENT DOCUMENTS

| | | | | |
|---|---|---|---|---|
| 5,481,703 A | * | 1/1996 | Kato ........................... | 707/101 |
| 5,499,371 A | | 3/1996 | Henninger et al. .......... | 395/700 |
| 5,875,334 A | | 2/1999 | Chow et al. ................. | 395/705 |
| 5,963,937 A | * | 10/1999 | Yamasaki et al. ............ | 707/201 |
| 6,339,775 B1 | * | 1/2002 | Zamanian et al. ........... | 707/100 |

OTHER PUBLICATIONS

D. Chamberlin, "A Complete Guide to DB2 Universal Data", 1998, pp. 649–652.

* cited by examiner

Primary Examiner—Safet Metjahic
Assistant Examiner—Cam-Linh Nguyen
(74) Attorney, Agent, or Firm—David W. Victor; Konrad Raynes Victor & Mann & LLP

(57) ABSTRACT

Disclosed is a system, method, and program for extracting data from a record in a first format and inserting data into a record in a second format during an insert operation. A determination is made of location information for data in at least one record in at least one column in the first format involved in the insert operation from which data will be extracted and of location information for data in at least one record in at least one column in the second format involved in the insert operation into which the data extracted from a corresponding column in the first format will be inserted. For each column from which data will be extracted, the determined location information is used to generate at least one instruction to move the data in each column in the record in the first format to each corresponding column of one record in the second format. The location information of the columns in records in the first and second formats involved in the data movement operations is encoded in the at least one instruction. The instruction may be repeated for multiple records in the first format from which data will be extracted into multiple records in the second format.

36 Claims, 4 Drawing Sheets

| Column Name | Starting Position | Length | Data Type |
|---|---|---|---|
| COL1 | 1 | 5 | CHAR |
| COL2 | 6 | 4 | INTEGER |
| COL3 | 10 | 5 | DECIMAL |
| COL4 | 15 | 4 | DATE |
| COL5 | 19 | 10 | CHAR |

Fig. 3

| Index Name | Column Number | Column Name |
|---|---|---|
| INDEX1 | 1 | COL1 |
| INDEX2 | 2 | COL4 |
| INDEX3 | 3 | COL2 |
| INDEX2 | 1 | COL5 |
| INDEX2 | 2 | COL3 |

Fig. 4

METHOD, SYSTEM, AND PROGRAM FOR EXTRACTING DATA FROM DATABASE RECORDS USING DYNAMIC CODE

BACKGROUND OF THE INVENTION

1. Field of the Invention

The present invention relates to a method, system, and program for extracting data from one or more columns in a record having a first format and inserting the extract data into columns in a table in a second format using dynamic code generated from tables defining the first and second formats.

2. Description of the Related Art

Data records in a relational database management system (RDBMS) are maintained in tables, which are a collection of rows all having the same columns. Each column maintains information on a particular type of data for the data records which comprise the rows. One or more indexes may be associated with each table. An index is an ordered set of pointers to data records in the table based on the data in one or more columns of the table. In some cases, all the information needed by a query may be found in the index, making it unnecessary to search the actual table. An index is comprised of rows or index entries which include an index key and a pointer to a database record in the table having the key column values of the index entry key. An index key is comprised of key columns that provide an ordering to records in a table. The index key columns are comprised of the columns of the table, and may include any of the values that are possible for that particular column. Columns that are used frequently to access a table may be used as key columns.

A database management system (DBMS) includes control tables that define the format of tables and indexes within the database. A table definition table (TDT) includes information defining the format of the columns in a database table, such as the data type in each column (field) and the length of each column. An index definition table (IDT) defines the columns that comprise each index key, i.e., one or more columns from a table. One IDT may maintain information for multiple indexes on the same table.

In International Business Machines Corporation's (IBM) DB2 product,** a load utility is used to add data from records to an index. To add index keys to an index, the prior art load utility would have to extract the data from the columns in the record that correspond to the index key and then add such data to the index columns. During this operation, the load utility looks-up the definition of the table in the TDT and the index in the IDT, and uses those definitions to guide the extraction of data from columns from the rows of the table to the columns in the index keys. In very large databases, the load utility may insert data from millions or billions of rows into index keys. For each load operation, the load utility would look up the table and index definitions to extract columnar data from a table record to add to an index key for each record inserted into the index.

**Microsoft, Windows, and Windows NT are registered trademarks of Microsoft Corporation; DB2, AIX, OS/390, and OS/2 are registered trademarks of IBM, MVS is a trademark of IBM; and Oracle8 is a trademark of Oracle Corporation.

Below are the steps performed by prior art load utilities to extract data from records in a table to add as index keys to an index:

1. Look-up IDT for the index to which data will be added and find the name of the first column in the key.
2. Look-up the TDT to find the location of the table column corresponding to the index key column, and that column's starting position and length in a record.
3. Using the column's starting position, locate the column within the record from the table, and use the column length to copy all the data from the start to end positions in the column to the position of the index key to which the data should be copied. The first copy operation to the index would copy the data to the first position of the index, which is the starting position of the first key. The index definition table would be used to determine the location of further key columns in the index to receive the copied data.
4. Repeat steps 1 to 3 for each additional column in the index key.
5. Repeat steps 1 to 4 for each additional index that will be updated from the record. (A single record can be added to multiple indexes that have key columns corresponding to the same table).

With the above prior art technique for adding records to an index, the load utility must look-up information in the TDT and IDT for each record from the table from which data is inserted into the index. Further, the TDT and IDT tables are looked-up for each column in the index because data is extracted from the record and added to the index on a column-by-column basis. Thus, when adding a large amount of records to index keys, the processing time to look-up the table and index definition information from the TDT and IDT can consume a significant amount of processing cycles and time, thereby degrading the performance of load and insert operations.

Thus, there is a need in the art for an improved technique for adding records from a database table to index keys.

SUMMARY OF THE PREFERRED EMBODIMENTS

To overcome the limitations in the prior art described above, preferred embodiments disclose a method, system, and program for extracting data from a record in a first format and inserting data into a record in a second format during an insert operation. A determination is made of location information for data in at least one record in at least one column in the first format involved in the insert operation from which data will be extracted and of location information for data in at least one record in at least one column in the second format involved in the insert operation into which the data extracted from a corresponding column in the first format will be inserted. For each column from which data will be extracted, the determined location information is used to generate at least one instruction to move the data in each column in the record in the first format to each corresponding column of one record in the second format. The location information of the columns in records in the first and second formats involved in the data movement operations is encoded in the at least one instruction. The instruction may be repeated for multiple records in the first format from which data will be extracted into multiple records in the second format.

In further embodiments, each column from which data is extracted is from one record in a table including records in the first format and each column into which data is inserted comprises a new record in an index in the second format.

In yet further embodiments, a search is made of at least one table for records that match a search criteria Each record from which data is extracted comprises records located in the search that match the search criteria. In such case, the columns into which the extracted data is inserted comprises a search key. The search key is used to query records in another table.

Still further, the at least one instruction is generated in response to a call from an insertion process. In such case, the at least one instruction extracts data from at least one column of a record in the first format in memory and inserts the data into a corresponding key column in an index in the second format.

Preferred embodiments provide a technique for inserting data from a column in a record to a column in another record that avoids having to look-up information in definition tables that define the format of the records. Instead, preferred embodiments dynamically generate code that embeds the format of the records from which data is extracted and to which data is inserted into instructions that can be repeatedly executed. This allows the insertion operation to be performed for multiple records without having to return to the definition tables to determine the format of the records subject to the move operation.

Thus, the preferred embodiment technique generates instructions to carry out multiple extraction and insertion operations from the same source table to the same target table, such as an index, by using the table and column definition information encoded in the instructions without having to repeatedly look-up the information in definition tables. New dynamic code would be generated for each source and target table subject to the move operations to allow multiple operations to be performed with respect to the same source and target using the generated dynamic code.

Preferred embodiments provide a faster and more efficient method for extracting data from columns in numerous records from one table and inserting the data into columns in another table than current techniques that repeatedly refer to the definition tables for each individual data movement operation.

BRIEF DESCRIPTION OF THE DRAWINGS

Referring now to the drawings in which like reference numbers represent corresponding parts throughout:

FIG. 3 is an example of a table definition table;

FIG. 4 is an example of an index definition table; and

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
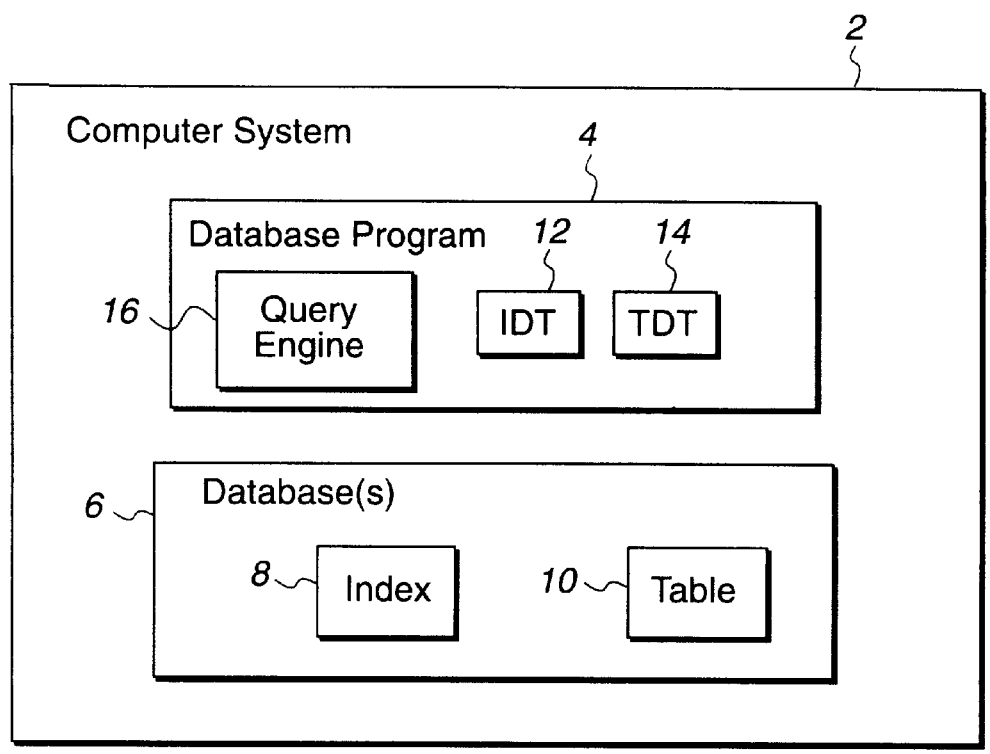
FIG. 1 is a block diagram illustrating a computing environment in which preferred embodiments of the present invention are implemented.

FIG. 1 illustrates a computing environment in which a database may be implemented. A computer system 2, which may be a computer including an operating system such as MICROSOFT WINDOWS 98 and WINDOWS NT, AIX, OS/390, OS/2, MVS, etc., includes a database program 4, such as DB2, MICROSOFT Access, Oracle Corporation's ORACLE 8, etc. The database program 4 is used to access database information maintained in one or more databases 6. The database(s) 6 may consist of one or more indexes 8 and one or more tables 10. The indexes 8 provide an ordered set of pointers to data in the table 10 based on the data in one or more columns of the table. Further details of the structure and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in their entirety.

**Microsoft, Windows, and Windows NT are registered trademarks of Microsoft Corporation; DB2, AIX, OS/390, and OS/2 are registered trademarks of IBM, MVS is a trademark of IBM; and Oracle8 is a trademark of Oracle Corporation.

The database program 4 further includes an index definition table (IDT) 12 defining the format of the columns in each index 8 and a table definition table (TDT) 14 defining the format engine 16 receives a search request including criteria to use to retrieve database records in the table 10. The search engine may execute the search by processing all the records in the table 10 or scan an index 8 having columns that are involved in the search in a manner known in the art. The query engine 16 would scan the index 8 to restrict the records in the table 10 that are fetched, thereby reducing the number of record transfers or I/O operations concerning pages 18a, b, c that include the table 10 records.

Figure 2:
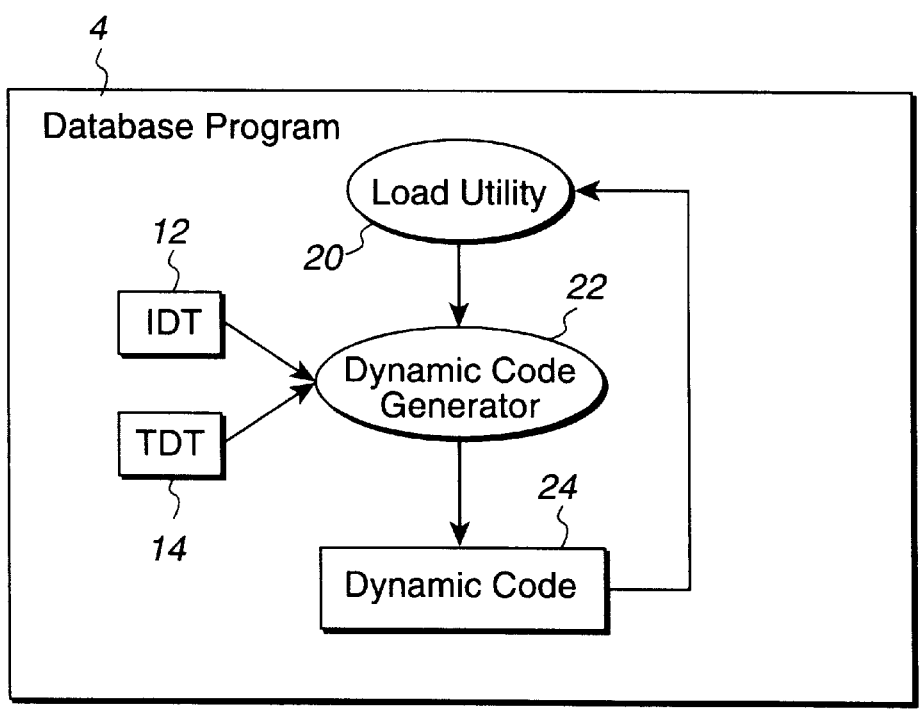
FIG. 2 illustrates components of the database program used to generate the dynamic code in accordance with preferred embodiments of the present invention.

FIG. 2 illustrates components within the database program 4 in which preferred embodiments are implemented. A load utility 20 performs the functions of loading and inserting data from columns in the table 10 to the key columns of the index 8. In preferred embodiments, as part of initialization, the load utility 20 would make a call to a dynamic code generator 22, which generates dynamic code 24 for the load utility 20 to use to insert data from one or more columns of records in the table 10 to the key columns of the index 8. The dynamic code 24 allows the load utility 20 to extract keys from the table to the index without having to look-up the table 10 and index 8 formats in the index definition table (IDT) 12 and the table definition table (TDT) 14. The dynamic code 24 saves the load utility 20 substantial time and processing cycles when extracting data from the table 10 to the index 8 because the load utility may avoid looking up the definition tables. The dynamic code 24 comprises computer instructions in machine code that the load utility 20 executes to determine the columns in the record from which to extract data and the columns in the index 8 at which to insert the extracted data.

FIG. 3 illustrates an example of the content of the table definition table (TDT) as defining the starting position, length and data type for each column of a table. FIG. 4 illustrates an example of the content of an index definition table (IDT) as defining each column from a table included in one or more key columns of indexes defined against the table. Thus, the index definition table (IDT) defines all indexes including columns from a single table. The second column of the IDT defines the column number of the index and the third column includes the corresponding column in the table that will provide data to the index column.

Figure 5A:
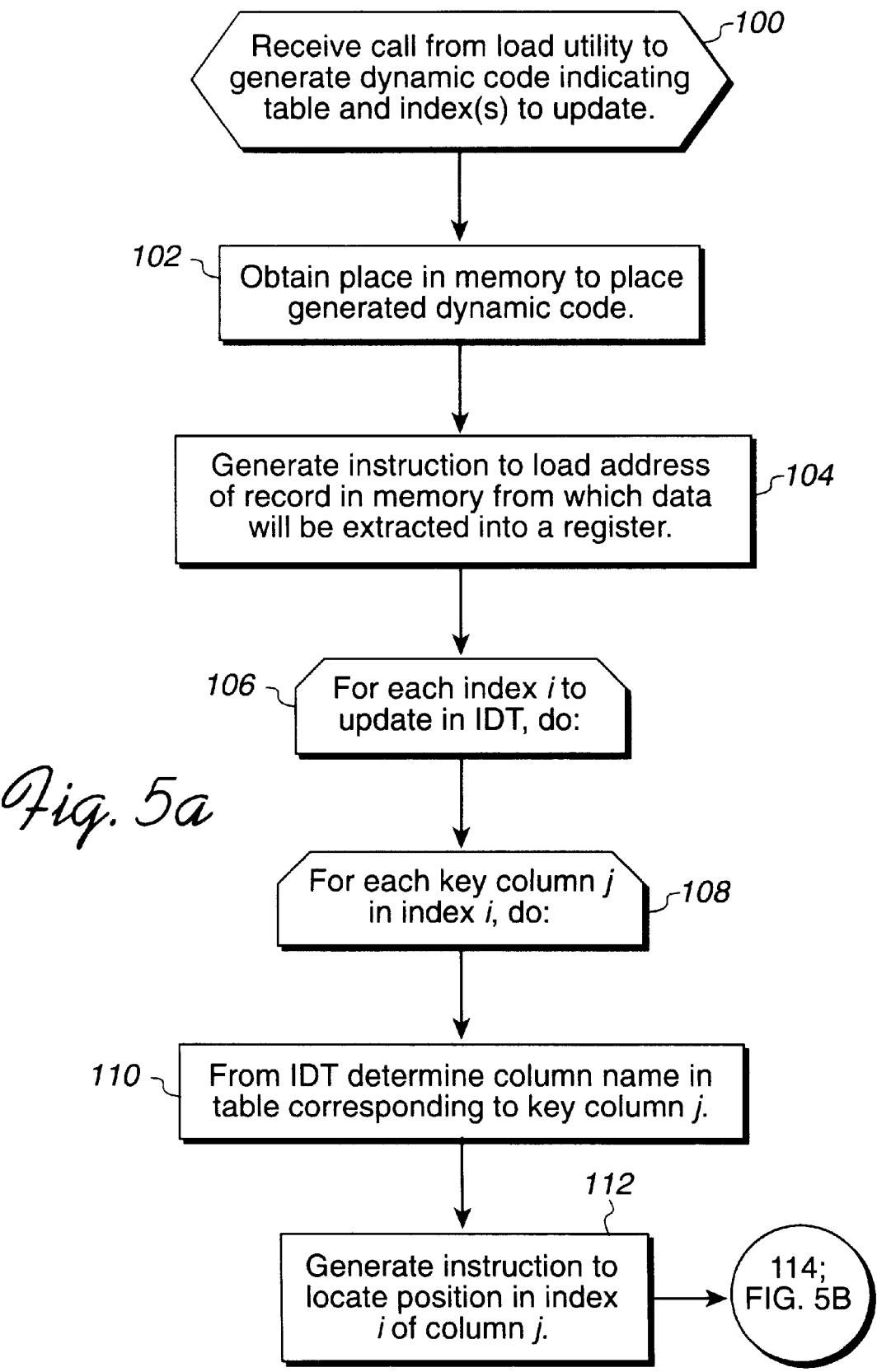
FIGS. 5a, b illustrate logic used to generate dynamic code in accordance with preferred embodiments of the present invention.
Figure 5B:
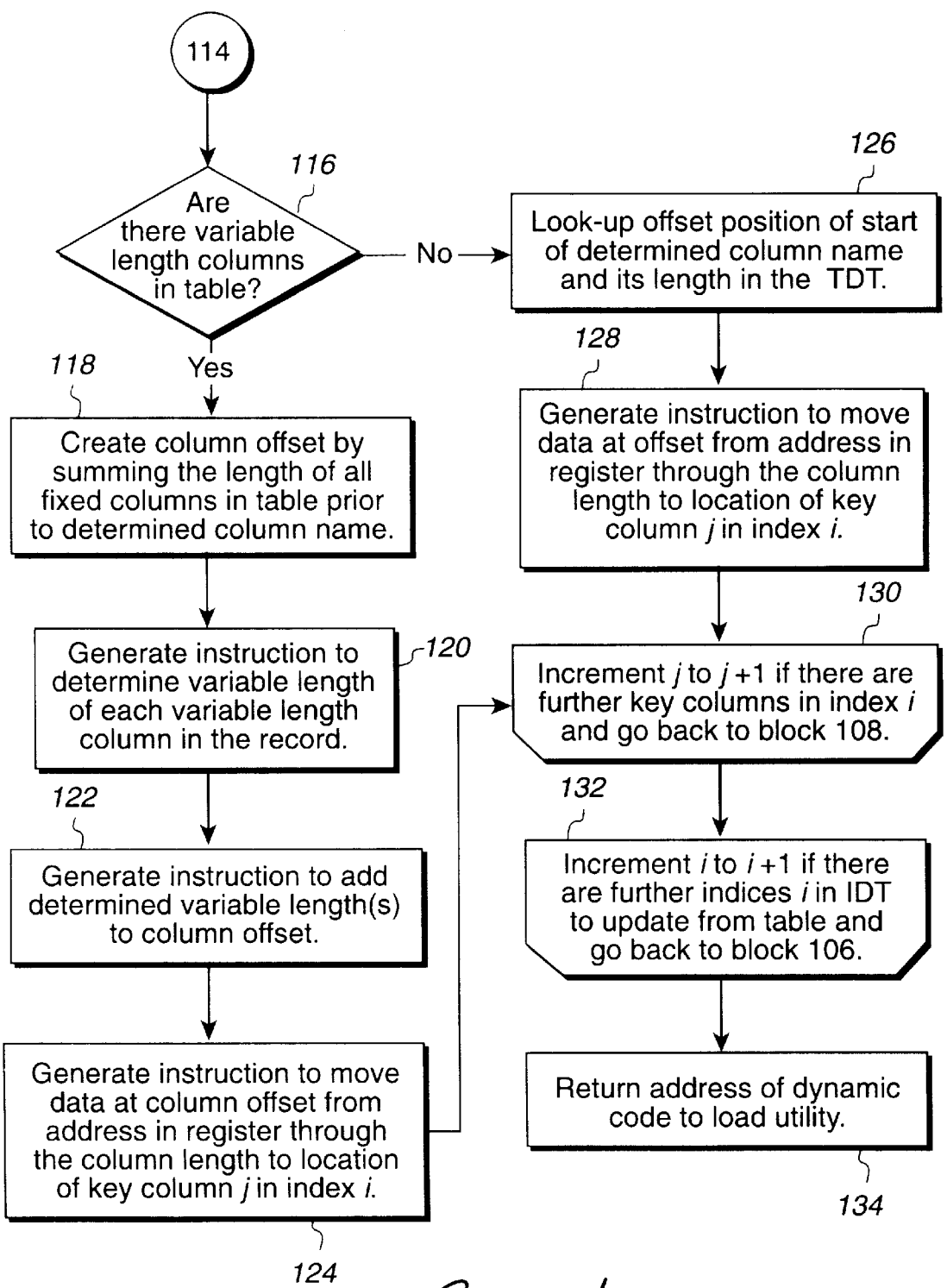

FIGS. 5a, b illustrate logic implemented in the dynamic code generator 22 to generate the dynamic code 24 for use by the load utility 20. With respect to FIG. 5a, control begins at block 100 with the dynamic code generator 22 receiving a call from the load utility 20 to generate dynamic code 24, including as parameters the IDT and TDT or pointers thereto, where the IDT indicates the indexes that will be updated with rows from the table defined by the TDT. The dynamic code generator 22 then obtains (at block 102) a memory location to place the dynamic code that the load utility 20 will use. The dynamic code generator 22 generates (at block 104) an instruction to load the address of the row in memory from which data will be extracted into a register (or pointer). The load utility 20 places a row from the table in memory at this address indicated in the register. This address is at the start of the record in memory. A row from the table 10 is first transferred to memory before data is extracted and moved to the index key columns. In preferred embodiments, the dynamic code generator 22 generates instructions that are in the machine code of the system on which the database program 4 is installed.

At block 106, a loop begins to consider each index i in the IDT(s) 12 provided by the load utility 20. For each index i, a loop begins at block 108 to consider each key column j in index i to which data will be copied from columns of the row. Within this nested loop, blocks 110 through 128 are executed for every key column j in every index i to update. At block 110, the dynamic code generator 22 processes the IDT 12 to determine the table column name for key column j in index i, which is shown as the third column in FIG. 3. The dynamic code generator 22 then generates (at block 112) an instruction to locate key column j in index i into which the data will be inserted for use by the load utility 20 to determine the location of the key column in the index into which the data is copied. For the first key column in the index, the location will be the first position in the index i.

The dynamic code generator 22 must then determine the offset from the starting address of the row in memory, which was loaded in the register, of the column in memory from where data will be extracted and added to the key column j. This determination will vary for tables that have variable length columns. The dynamic code generator 22 determines (at block 114) from the TDT 12 whether there are any variable length columns in the table 10. If so, then the dynamic code generator 22 (at block 118) initializes a column offset variable that the load utility 20 will use to determine the column offset and adds to the column offset the length of all fixed columns prior to the determined column name corresponding to the key column j in the index i. This information on the columns in the row and their length can be obtained from the table definition table shown in FIG. 3.

The dynamic code generator 22 would then generate code (at block 120) to cause the load utility 20 to determine the length of all variable length columns prior to the determined column name. The length of the variable length columns is indicated in the current row in memory, and may vary for different rows of the table. The dynamic code generator 22 would generate an instruction (at block 122) to cause the load utility to add the length of all variable length columns prior to the determined column name to the column offset, which already includes the length of all preceding fixed length columns. This column offset indicates the location in the row offset from the starting address of the determined column name in the row from which data will be extracted. The dynamic code generator 22 generates (at block 124) an instruction to move the data at the location of the determined column name, which is offset from the start address of the row by the determined column offset, to the location of key column j, which was determined at block 112. The data from the start of the determined column through the column length would be moved.

If, at block 116, there are no variable length columns in the row, then the dynamic code generator 22 looks-up (at block 126) the offset position of the start of the determined column name to extract from the TDT 14, which may be calculated by adding the fixed lengths of all columns prior to the determined column name. The dynamic code generator 22 then generates an instruction (at block 128) to cause the load utility 20 to move the data at the offset, determined at block 126, from the start of the row through the column length to the location of the key column j in index i. After generating the instruction to locate the data in the row in memory and extract the data to the key column j, the logic would return (at block 130) to block 108 to consider any further key columns in index i and would return (at block 132) to block 106 to consider any further indexes. After generating the dynamic code 24 instructions, the dynamic code generator 22 would return the start address of the generated dynamic code 24 to the load utility 20. The load utility 20 would then use this address to access and execute the dynamic code instructions 24 to extract rows from the record in memory into the indexes. The dynamic code 24 allows the load utility 20 to perform the extraction and insertion operations directly, without having to locate the position of the extraction and insertion positions in the TDT 14 and IDT 12.

With preferred embodiments, the load utility 20 only has to insert a record into the memory and then execute the dynamic code 24 to move data from the record in memory into the key columns of the index.

In preferred embodiments, the load utility 20 may make the call to the dynamic code generator 22 before performing any insertion operations to use the dynamic code 24 for all data extraction and insertion operations. In alternative embodiments where there may not be many insertion operations, the load utility 20 or insertion process may perform the extraction and insertion operations a threshold number of times using the IDT 12 and TDT 14 for each insertion before having the dynamic code generator 22 generate the dynamic code 24. After the dynamic code 24 is generated, the insertion process would then use the dynamic code 24 to extract and insert data into the key columns. In this way, the threshold is used to determine when it is likely that there will be a sufficient number of insertions to warrant the use of the dynamic code generator 22 to generate the dynamic code 24.

The resulting dynamic code 24 includes instructions to cause the load utility 20 to proceed directly to the column location in the record in memory and extract the data and then proceed directly to the corresponding key column location in the index to insert the data without having to return to the IDT 12 and TDT 14 to determine the location of the source and target of the move operations.

The dynamic code generator 22 of the preferred embodiments may be utilized with the query engine 16 for use in searching an index of a table to locate rows in the table that satisfy search conditions on the index key columns. For instance in a multi-dimensional database, certain tables, referred to as dimensions, may include extended data related to the column in a main table. These dimension tables may be searched for records that match certain of the extended conditions. Data in the matching records in the dimension table may then be used to form a search key to search the main table or an index thereon. For instance, a main table may include information on sales that occur in different stores. One of the dimension tables may include information on each store location, population, customer income, etc.

Searches may be performed on the dimension table to locate stores that satisfy certain conditions. Sales records may then be searched in the main table for the sale transactions for those stores that satisfied the query on the dimension table.

In the above multi-dimensional analysis situation, the query engine 16 needs to extract data from records in a table and use the data to form a search key that can be used to search an index on the main table. Before extracting the data from the matching records to form the search key, the query engine 16 can call the dynamic code generator 22 to generate code that would cause the query engine 16 to extract the data from the rows in the memory located during the dimension query and then insert them into a search key that can be applied against a table or index. Thus, instead of using the logic of FIGS. 5a, b to insert data from columns in a record into an index, the logic is used to extract data from records that match an initial query, such as a query specified in an SQL WHERE clause, and then insert the data from columns in the matching records into a search key.

The preferred embodiment dynamic code generator 22 generates code that is tailored to the format of the tables and/or indexes subject to the extraction and insertion operations. In this way, the dynamic code is generated anew for each new load or query operation on a particular source and target tables. In large scale extraction and insertion operations, the process of extracting and insertion can be performed in as few as four instructions. Using prior art techniques that require looking-up definition information in the index definition table (IDT) and table definition table (TDT) in preparation for each extraction and insertion has been found to require ten to a hundred times more instructions than the dynamic code generated in accordance with preferred embodiments. Thus, for numerous insertion and extraction operations on the same tables and indexes, the preferred embodiment technique provides substantial time and processing savings over current load and query techniques.

CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

The preferred embodiment dynamic code generator was described as dynamically generating instructions for extracting and inserting data for load operations to insert data into an index and for constructing a search key. However, the preferred embodiment dynamic code generator can be used to dynamically generate code to extract and insert data in contexts other than a load utility and query.

The algorithm of the preferred embodiments was described as having particular steps in a particular order. However, alternative algorithms in accordance with the invention may include modifications, deletions, and/or additions to the steps described in the preferred embodiment algorithms. Such modified algorithms would still produce more efficient and faster searches than current techniques.

In preferred embodiments, data was extracted from a record in a table and inserted into key columns in an index. For this reason, an index definition table was used to determine the format of the records into which the extracted data is inserted. However, in alternative embodiments, the target of the insertion operation may comprise a table other than an index. In such case, other tables, such as the target table definition table would be used to determine the column offsets in the dynamic code for the target columns receiving extracted data.

In preferred embodiments, the dynamic code generator component was invoked by a call from the load utility. In alternative embodiments, the functionality of the dynamic code generator may be incorporated into the load utility or query engine.

In summary, preferred embodiments disclose a system, method, and program for extracting data from a record in a first format and inserting data into a record in a second format during an insert operation. A determination is made of location information for data in at least one record in at least one column in the first format involved in the insert operation from which data will be extracted and of location information for data in at least one record in at least one column in the second format involved in the insert operation into which the data extracted from a corresponding column in the first format will be inserted. For each column from which data will be extracted, the determined location information is used to generate at least one instruction to move the data in each column in the record in the first format to each corresponding column of one record in the second format. The location information of the columns in records in the first and second formats involved in the data movement operations is encoded in the at least one instruction. The instruction may be repeated for multiple records in the first format from which data will be extracted into multiple records in the second format. The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for extracting data from a record in a first format and inserting data into a record in a second format during an insert operation, comprising:

determining location information for data in at least one record in at least one column in the first format involved in the insert operation from which data will be extracted;

determining location information for data in at least one record in at least one column in the second format involved in the insert operation into which the data extracted from a corresponding column in the first format will be inserted; and for each column from which data will be extracted, using the determined location information to dynamically generate at least one instruction to move the data in each column in the record in the first format to each corresponding column of one record in the second format, wherein the location information of each column in the records in the first and second formats involved in the data movement operations is encoded in the at least one instruction, and wherein the at least one instruction is dynamically generated in response to a request to insert data into the record in the second format.

2. The method of claim 1, wherein the instruction may be repeated for multiple records in the first format from which data will be extracted.

3. The method of claim 1, wherein records in the first format have at least one of a different number of columns and different column data types than records in the second format.

4. The method of claim 1, wherein the location information for data in records in each column in the first format involved in the insert operation is determined from a first table indicating an offset of the column from a start of the record and a length of the column and the location for data in each column in the second format involved in the insert operation is determined from a second table indicating a location of the corresponding column in records in the second format into which the data extracted from the first column is inserted, wherein the first table and the second table are not the tables from which data is extracted or into which data is inserted.

5. The method of claim 1, wherein each column from which data is extracted is from one record in a table including records in the first format and wherein each column into which data is inserted comprises a new record in an index in the second format.

6. The method of claim 1, further comprising:
searching at least one table for records that match a search criteria, wherein each record from which data is extracted comprises records located in the search that match the search criteria, and wherein the at least one column into which the extracted data is inserted comprises a search key; and
using the search key to query records in another table.

7. The method of claim 1, wherein the at least one instruction is generated in response to a call from an insertion process, wherein the at least one instruction extracts data from at least one column of a record in the first format in memory and inserts the data into a corresponding key column in an index in the second format.

8. The method of claim 7, further comprising generating an instruction to load an address in memory of a start of the record from which data is to be extracted into a register, wherein the location information for the at least one column in the first format is an offset from the address in memory, and wherein the location information for the at least one column into which data is extracted comprises one key column of the index.

9. The method of claim 8, wherein the location information for the record in the first format comprises a first table including information on the columns of records in the first format and the location information for the index comprises a second table including information on the location of key columns of the index and information indicating for each key column a corresponding column in records in the first format, and wherein for a given key column, the second table is used to determine the column in the records in the first format corresponding to the given key column and the first table is used to determine the location in the record in the memory of the column corresponding to the key column from which data will be extracted.

10. The method of claim 9, further comprising:
performing a threshold number of move operations by determining the location information from the first and second tables during each move operation, wherein the instruction is generated and used after the move operations have been performed the threshold number of times.

11. The method of claim 7, wherein data is extracted from the columns in the record in memory into key columns in a plurality of indexes.

12. The method of claim 7, further comprising loading multiple records one-at-a-time into the same location of memory, wherein while the record is loaded in the memory, the code is executed to move the data from columns in the record loaded into memory into the index columns.

13. A system for extracting data from a record in a first format and inserting data into a record in a second format during an insert operation, comprising:
means for determining location information for data in at least one record in at least one column in the first format involved in the insert operation from which data will be extracted;
means for determining location information for data in at least one record in at least one column in the second format involved in the insert operation into which the data extracted from a corresponding column in the first format will be inserted; and
for each column from which data will be extracted, means for using the determined location information to dynamically generate at least one instruction to move the data in each column in the record in the first format to each corresponding column of one record in the second format, wherein the location information for each column in the records in the first and second formats involved in the data movement operations is encoded in the at least one instruction, and wherein the at least one instruction is dynamically generated in response to a request to insert data into the record in the second format.

14. The system of claim 13, wherein the instruction may be repeated for multiple records in the first format from which data will be extracted.

15. The system of claim 13, wherein records in the first format have at least one of a different number of columns and different column data types than records in the second format.

16. The system of claim 13, wherein the means for determining location information for data in records in each column in the first format involved in the insert operation determines location information from a first table indicating an offset of the column from a start of the record and a length of the column and the means for determining location information for data in each column in the second format involved in the insert operation determines location information from a second table indicating a location of the corresponding column in records in the second format into which the data extracted from the first column is inserted, wherein the first table and the second table are not the tables from which data is extracted or into which data is inserted.

17. The system of claim 13, wherein each column from which data is extracted is from one record in a table including records in the first format and wherein each column into which data is inserted comprises a new record in an index in the second format.

18. The system of claim 13, further comprising:

means for searching at least one table for records that match a search criteria, wherein each record from which data is extracted comprises records located in the search that match the search criteria, and wherein the at least one column into which the extracted data is inserted comprises a search key; and means for using the search key to query records in another table.

19. The system of claim 13, wherein the at least one instruction is generated in response to a call from an insertion process, wherein the at least one instruction extracts data from at least one column of a record in the first format in memory and inserts the data into a corresponding key column in an index in the second format.

20. The system of claim 19, further comprising means for generating an instruction to load an address in memory of a start of the record from which data is to be extracted into a register, wherein the location information for the at least one column in the first format is an offset from the address in memory, and wherein the location information for the at least one column into which data is extracted comprises one key column of the index.

21. The system of claim 20, wherein the location information for the record in the first format comprises a first table including information on the columns of records in the first format and the location information for the index comprises a second table including information on the location of key columns of the index and information indicating for each key column a corresponding column in records in the first format, and wherein for a given key column, the second table is used to determine the column in the records in the first format corresponding to the given key column and the first table is used to determine the location in the record in the memory of the column corresponding to the key column from which data will be extracted.

22. The system of claim 21, further comprising:

means for performing a threshold number of move operations by determining the location information from the first and second tables during each move operation, wherein the instruction is generated and used after the move operations have been performed the threshold number of times.

23. The system of claim 19, wherein data is extracted from the columns in the record in memory into key columns in a plurality of indexes.

24. The system of claim 19, further comprising means for loading multiple records one-at-a-time into the same location of memory, wherein while the record is loaded in the memory, the code is executed to move the data from columns in the record loaded into memory into the index columns.

25. An article of manufacture for use in extracting data from a record in a first format and inserting data into a record in a second format during an insert operation, the article of manufacture comprising at least one computer program capable of causing a computer to perform:

determining location information for data in at least one record in at least one column in the first format involved in the insert operation from which data will be extracted;

determining location information for data in at least one record in at least one column in the second format involved in the insert operation into which the data extracted from a corresponding column in the first format will be inserted; and for each column from which data will be extracted, using the determined location information to dynamically generate at least one instruction to move the data in each column in the record in the first format to each corresponding column of one record in the second format, wherein the location information of the columns in records in the first and second formats involved in the data movement operations is encoded in the at least one instruction, and wherein the at least one instruction is dynamically generated in response to a request to insert data into the record in the second format.

26. The article of manufacture of claim 25, wherein the instruction may be repeated for multiple records in the first format from which data will be extracted.

27. The article of manufacture of claim 25, wherein records in the first format have at least one of a different number of columns and different column data types than records in the second format.

28. The article of manufacture of claim 25, wherein the location information for data in records in each column in the first format involved in the insert operation is determined from a first table indicating an offset of the column from a start of the record and a length of the column and the location for data in each column in the second format involved in the insert operation is determined from a second table indicating a location of the corresponding column in records in the second format into which the data extracted from the first column is inserted, wherein the first table and the second table are not the tables from which data is extracted or into which data is inserted.

29. The article of manufacture of claim 25, wherein each column from which data is extracted is from one record in a table including records in the first format and wherein each column into which data is inserted comprises a new record in an index in the second format.

30. The article of manufacture of claim 25, further comprising:

searching at least one table for records that match a search criteria, wherein each record from which data is extracted comprises records located in the search that match the search criteria, and wherein the at least one column into which the extracted data is inserted comprises a search key; and using the search key to query records in another table.

31. The article of manufacture of claim 25, wherein the at least one instruction is generated in response to a call from an insertion process, wherein the at least one instruction extracts data from at least one column of a record in the first format in memory and inserts the data into a corresponding key column in an index in the second format.

32. The article of manufacture of claim 31, further comprising generating an instruction to load an address in memory of a start of the record from which data is to be extracted into a register, wherein the location information for the at least one column in the first format is an offset from the address in memory, and wherein the location information for the at least one column into which data is extracted comprises one key column of the index.

33. The article of manufacture of claim 32, wherein the location information for the record in the first format comprises a first table including information on the columns of records in the first format and the location information for the index comprises a second table including information on the location of key columns of the index and information indicating for each key column a corresponding column in records in the first format, and wherein for a given key column, the second table is used to determine the column in the records in the first format corresponding to the given key column and the first table is used to determine the location in the record in the memory of the column corresponding to the key column from which data will be extracted.

34. The article of manufacture of claim 33, further comprising:

performing a threshold number of move operations by determining the location information from the first and second tables during each move operation, wherein the instruction is generated and used after the move operations have been performed the threshold number of times.

35. The article of manufacture of claim 31, wherein data is extracted from the columns in the record in memory into key columns in a plurality of indexes.

36. The article of manufacture of claim 31, further comprising loading multiple records one-at-a-time into the same location of memory, wherein while the record is loaded in the memory, the code is executed to move the data from columns in the record loaded into memory into the index columns.

* * * * *

UNITED STATES PATENT AND TRADEMARK OFFICE
CERTIFICATE OF CORRECTION

PATENT NO. : 6,567,816 B1
DATED : May 20, 2003
INVENTOR(S) : Paramesh Sampatrai Desai and John Marland Garth It is certified that error appears in the above-identified patent and that said Letters Patent is hereby corrected as shown below:

<u>Column 4,</u>
Line 23, after "format", insert -- of each column in the table 10. The database program 4 includes a query engine 16. The query --.

Signed and Sealed this

Thirteenth Day of December, 2005

JON W. DUDAS
*Director of the United States Patent and Trademark Office*